United States Patent
Shveidel

(10) Patent No.: US 10,635,503 B1
(45) Date of Patent: Apr. 28, 2020

(54) SYSTEMS AND METHODS FOR SEMAPHORE SYNCHRONIZATION

(71) Applicant: EMC IP Holding Company LLC, Hopkinton, MA (US)

(72) Inventor: Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 178 days.

(21) Appl. No.: 15/884,814

(22) Filed: Jan. 31, 2018

(51) Int. Cl.
*G06F 9/52* (2006.01)
*G06F 9/30* (2018.01)
*G06F 9/50* (2006.01)
*G06F 13/16* (2006.01)
*G06F 16/176* (2019.01)

(52) U.S. Cl.
CPC ............ *G06F 9/52* (2013.01); *G06F 9/30087* (2013.01); *G06F 9/5005* (2013.01); *G06F 13/1642* (2013.01); *G06F 13/1663* (2013.01); *G06F 16/1767* (2019.01); *G06F 16/1774* (2019.01); *G06F 9/526* (2013.01)

(58) Field of Classification Search
None
See application file for complete search history.

(56) References Cited

U.S. PATENT DOCUMENTS 4,316,245 A * 2/1982 Luu ........................... G06F 9/52
710/15
4,318,182 A * 3/1982 Bachman ................ G06F 9/524
710/240

(Continued)

OTHER PUBLICATIONS

Buhr, et al., "The μSystem: Providing Light-weight Concurrency on Shared-memory Multiprocessor Computers Running UNIX", Sep. 1990, John Wiley & Sons, Ltd., vol. 20(9), pp. 929-964 (Year: 1990).*

*Primary Examiner* — Qing Yuan Wu
(74) *Attorney, Agent, or Firm* — Daly, Crowley Mofford & Durkee, LLP

(57) ABSTRACT

A system for controlling shared computing resources is provided including a semaphore for controlling concurrent access to one or more computing resources by one or more worker processing threads, the semaphore including a semaphore counter corresponding to vacancies of one or more computing resources and a semaphore queue for resource requests of the one or more worker processing threads waiting for the one or more computing resources. The semaphore is programmed and configured to decrement the semaphore counter when allocating one of the computing resources to one of the worker threads and configured to increment the semaphore counter when releasing one of the computing resources from one of the worker threads. The semaphore increments the queue of requests from the one or more worker threads if a request for resource access occurs when the counter of the semaphore counter is zero or less than zero. The semaphore counter is decremented when receiving a force decrement command for reducing the number of computing resources allocable to the worker threads and is not forced to wait in a working queue for the decrement to occur. If the counter is zero or less than zero at the time of the force decrement command, the semaphore counter will further decrease in value.

13 Claims, 5 Drawing Sheets

(56) References Cited

U.S. PATENT DOCUMENTS

| | | | | | |
|---|---|---|---|---|---|
| 4,369,494 | A | * | 1/1983 | Bienvenu | G06F 9/52 713/400 |
| 4,374,409 | A | * | 2/1983 | Bienvenu | G06F 9/52 718/106 |
| 4,394,725 | A | * | 7/1983 | Bienvenu | G06F 9/52 718/106 |
| 4,395,757 | A | * | 7/1983 | Bienvenu | G06F 9/52 718/104 |

* cited by examiner

SYSTEMS AND METHODS FOR SEMAPHORE SYNCHRONIZATION

BACKGROUND

Semaphores are utilized to manage and synchronize shared resources of computer-based systems such as data storage resources. Typically, a semaphore will have a semaphore counter representative of the number or amount of a resource that is available. In some systems, resource consuming threads will cause the semaphore-counter to decrement when a resource is available and allocated. If the current counter value is smaller than the required quantity needed by the thread, the thread will be added to a waiting queue and may be suspended until the resource is available.

In some systems, a control thread (e.g., which may be used to allocate resources) changes properties of the semaphore and associated resources (e.g., such as their availability due to some system policy) and decrementing the semaphore counter. A control thread will typically accomplish decreasing the resource quantity by executing a standard semaphore decrement operation. This approach can be problematic because it potentially involves blocking the control thread and forcing it to wait for resource consuming threads to finish utilizing the resources. For example, if the semaphore counter reflects zero available resources, the semaphore counter cannot be decremented until it first equals a value greater than zero. Table 1 below shows an exemplary series of events utilizing a traditional semaphore.

TABLE 1

| Concurrently Used Resources | Available Resources | Semaphore Count | Queue | Event |
|---|---|---|---|---|
| 0 | 3 | 3 | 0 | |
| 1 | 2 | 2 | 0 | Request Resource |
| 2 | 1 | 1 | 0 | Request Resource |
| 3 | 0 | 0 | 0 | Request Resource |
| 3 | 0 | 0 | 1 | Request Resource |
| 3 | 0 | 0 | 2 | Request Resource |
| 3 | 0 | 0 | 1 | Release Resource |
| 3 | 0 | 0 | 2 | Request Resource |
| 3 | 0 | 0 | 3 | Control Thread Decrement |
| 3 | 0 | 0 | 2 | Release Resource |
| 3 | 0 | 0 | 1 | Release Resource |
| 2 | 0 | 0 | 1 | Request Resource |
| 2 | 0 | 0 | 0 | Release Resource |
| 1 | 1 | 1 | 0 | Release Resource |
| 0 | 2 | 2 | 0 | Release Resource |
| 0 | 3 | 3 | 0 | Control Thread Increment |

In some systems the semaphore is used as a gate to a working queue, and the semaphore counter reflects the number of resources that must be utilized before a particular operation is performed by a working thread (e.g., a batch write operation). In some systems, multiple control threads may decrement the semaphore counter to reduce the number of available resources and/or remove entries from the working queue. In some cases, multiple control threads (e.g., an I/O control thread and a cache control thread) may be working together to manage resources (e.g., size of batch writes from a cache resource).

In some systems, decrementing the semaphore and removing an entry from a working queue (by the control threads) may not be an atomic operation, and may result a "double decrement" for a period of time before consistency in the semaphore is recovered. In this case, consistency in the semaphore is recovered by incrementing the semaphore counter. However, if the semaphore counter is zero during the process of double decrementing, the control thread (e.g., I/O control thread) will have to wait for worker threads to release allocated resources before the control threads have an opportunity to manage and correct the semaphore counter.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of embodiments are directed to systems and methods for semaphore synchronization for managing shared resources including data storage resources.

An aspect of embodiments includes a system for controlling shared computing resources, the system including a semaphore for controlling concurrent access to one or more computing resources by one or more worker processing threads, the semaphore comprising a semaphore counter corresponding to vacancies of one or more computing resources and a semaphore queue for resource requests of the one or more worker processing threads.

In an embodiment, the semaphore is programmed and configured to decrement the semaphore counter when allocating one of the computing resources to one of the worker threads, increment the semaphore counter when releasing one of the computing resources from one of the worker threads, increment the semaphore queue of requests from the one or more worker threads if a request for resource access occurs when the counter of the semaphore counter is zero or less than zero, and decrement the counter of the semaphore counter when receiving a force decrement command from a control thread for reducing the number of computing resources allocable to the worker threads, wherein the semaphore counter will decrease to a negative integer value if the counter is zero or less than zero at the time of the resource decrement command.

In an embodiment, the semaphore is programmed and configured for decreasing the semaphore counter to a negative integer value in which one of the one or more computing resources is deallocated for use by the one or more worker threads prior to any reallocation of the one of the one or more computing resources to the one or more worker threads.

In an embodiment, the one or more computing resources are dedicated to processing data storage requests from worker threads and the corresponding semaphore counter represents a number of concurrently available data storage segments available for the one or more worker threads.

In an embodiment, the queue of waiting resource requests corresponds to the number of resources that need to be requested prior to processing the requests.

In an embodiment, the one or more computing resources are dedicated to writing data from cache memory, the worker threads are destagers, and the corresponding semaphore counter represents a destager queue size that triggers a release of threads waiting in the semaphore queue.

In an embodiment, wherein upon the semaphore receiving and processing a force decrement command between the time that a worker thread decrements the semaphore counter and before the worker thread removes an entry from the working queue, the destager queue will be incremented to correct for a double decrement.

In aspects of embodiment, a method for sharing computing resources includes providing a semaphore for controlling concurrent access to one or more computing resources by one or more worker processing threads, the semaphore comprising a semaphore counter corresponding to vacancies of one or more computing resources and a semaphore queue of waiting resource requests from the one or more worker processing threads, decrementing the semaphore counter when allocating one of the computing resources to one of the worker threads, incrementing the semaphore counter when releasing one of the computing resources from one of the worker threads, incrementing the queue of requests from the one or more worker threads if a request for resource access occurs when the counter of the semaphore counter is zero or less than zero, and decrementing the counter of the semaphore counter when receiving a force decrement command from a control thread for reducing the number of computing resources allocable to the worker threads, wherein the semaphore counter will decrease to a negative integer value if the counter is zero or less than zero at the time of the resource decrement command.

In an embodiment, wherein upon decreasing the semaphore counter to a negative integer value, one of the one or more computing resources is deallocated for use by the one or more worker threads prior to any reallocation of the one of the one or more computing resources to the one or more worker threads.

In an embodiment, the one or more computing resources are dedicated to processing data storage requests from worker threads and the corresponding semaphore counter represents a number of concurrently available data storage segments available for the one or more worker threads.

In an embodiment, the queue of waiting resource requests corresponds to the number of resources that need to be requested prior to processing the requests.

In an embodiment, the one or more computing resources are dedicated to writing data from cache memory, the worker threads are destagers, and the corresponding semaphore counter represents a destager queue size that triggers a release of threads waiting in the semaphore queue In an embodiment, the semaphore receiving and processing a force decrement command between the time that a worker thread decrements the semaphore counter and before the worker thread removes one or more entries from the working queue, the semaphore will be incremented to correct for a double decrement.

In an aspect of embodiments, a computer program product is provided for sharing computing resources, the computer program product comprising a non-transitory computer-readable storage medium encoded with computer-executable program code programmed to cause the execution across one or more processors of providing a semaphore for controlling concurrent access to one or more computing resources by one or more worker processing threads, the semaphore comprising a semaphore counter corresponding to vacancies of one or more computing resources and a semaphore queue of waiting resource requests from the one or more worker processing threads, decrementing the semaphore counter when allocating one of the computing resources to one of the worker threads, incrementing the semaphore counter when releasing one of the computing resources from one of the worker threads, incrementing the queue of requests from the one or more worker threads if a request for resource access occurs when the counter of the semaphore counter is zero or less than zero, and decrementing the counter of the semaphore counter when receiving a force decrement command from a control thread for reducing the number of computing resources allocable to the worker threads, wherein the semaphore counter will decrease to a negative integer value if the counter is zero or less than zero at the time of the resource decrement command.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. Furthermore, the drawings are not necessarily to scale, emphasis instead being placed on the concepts disclosed herein.

DETAILED DESCRIPTION

Aspects of embodiments are directed to systems and methods for semaphores that manage shared resources, including data storage resources. It will be further understood that various changes in the details, materials, and arrangements of the parts that have been described and illustrated herein might be made by those skilled in the art without departing from the scope of the following claims.

Figure 1:
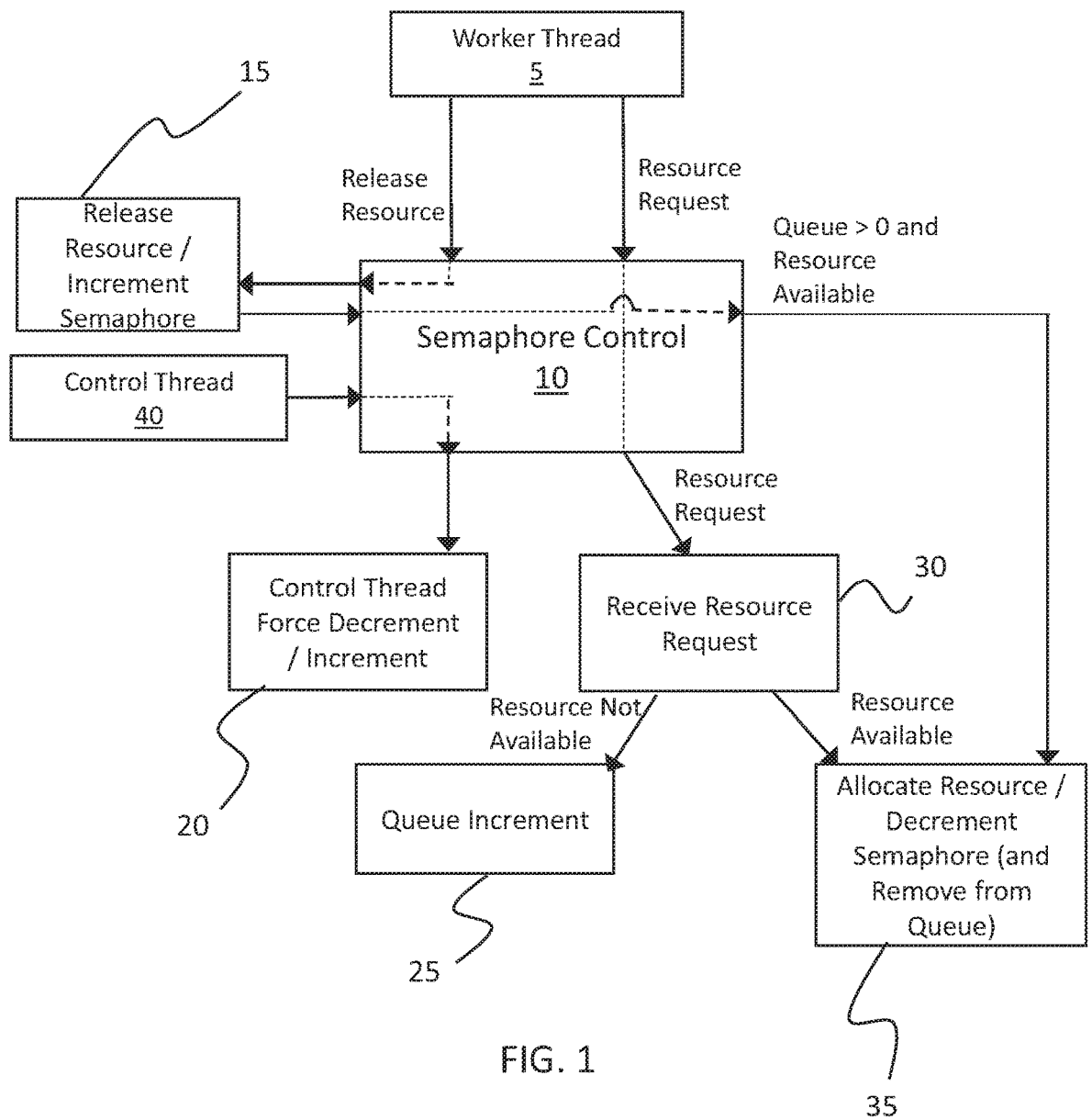
FIG. 1 is an illustrative block diagram of an exemplary semaphore process according to embodiments.

Referring to FIG. 1, an illustrative block diagram of an exemplary semaphore process according to embodiments is shown. A semaphore 10, which will have a counter value representing a number of available resources, can receive a request for one or more resources from a worker thread 5 and process the request at block 30. When the semaphore 10 receives the request, the semaphore can allocate at block 35 the one or more of the resources if they are available. If the resource(s) are not available (i.e., the semaphore counter is zero), the (worker thread) request can be placed in a working queue at block 25. In some embodiments, the worker thread cannot proceed with processing until the request is allocated and the worker thread is released from the working queue.

In embodiments, the shared resource(s) include data storage resources including the number of storage pages that can be accessed concurrently. In embodiments, the semaphore counter represents the maximum number of such pages that can be accessed concurrently.

When a worker thread is finished with the resource(s), the worker thread can release the resource at block 15, in which case a semaphore counter of the semaphore 10 is incremented. If there are threads waiting in the queue at 50, requested resource(s) will be released from the working queue at block 35 for the next thread in line in the queue and then the semaphore counter is decremented accordingly.

In embodiments, a control thread 40 can add one or more resources for use by worker threads or remove one or more resources from availability at block 20. In an embodiment, if the queue has threads waiting for a resource (and the semaphore counter is zero or less than zero) the control thread 40 can command the semaphore to immediately decrement ("force decrement") the semaphore counter even if the semaphore counter is zero or less than zero, thus making the semaphore counter negative one (−1) or less (<−1). This way, as soon as resources are released from a worker thread and the semaphore counter is incremented, the counter may still be zero or less than zero, preventing a worker thread (waiting in the queue or otherwise) from utilizing the resources removed from availability by the control thread. This way, the control thread will not have to wait in the back of the queue for any waiting worker threads prior to removing the resource(s) from availability.

Figure 2:
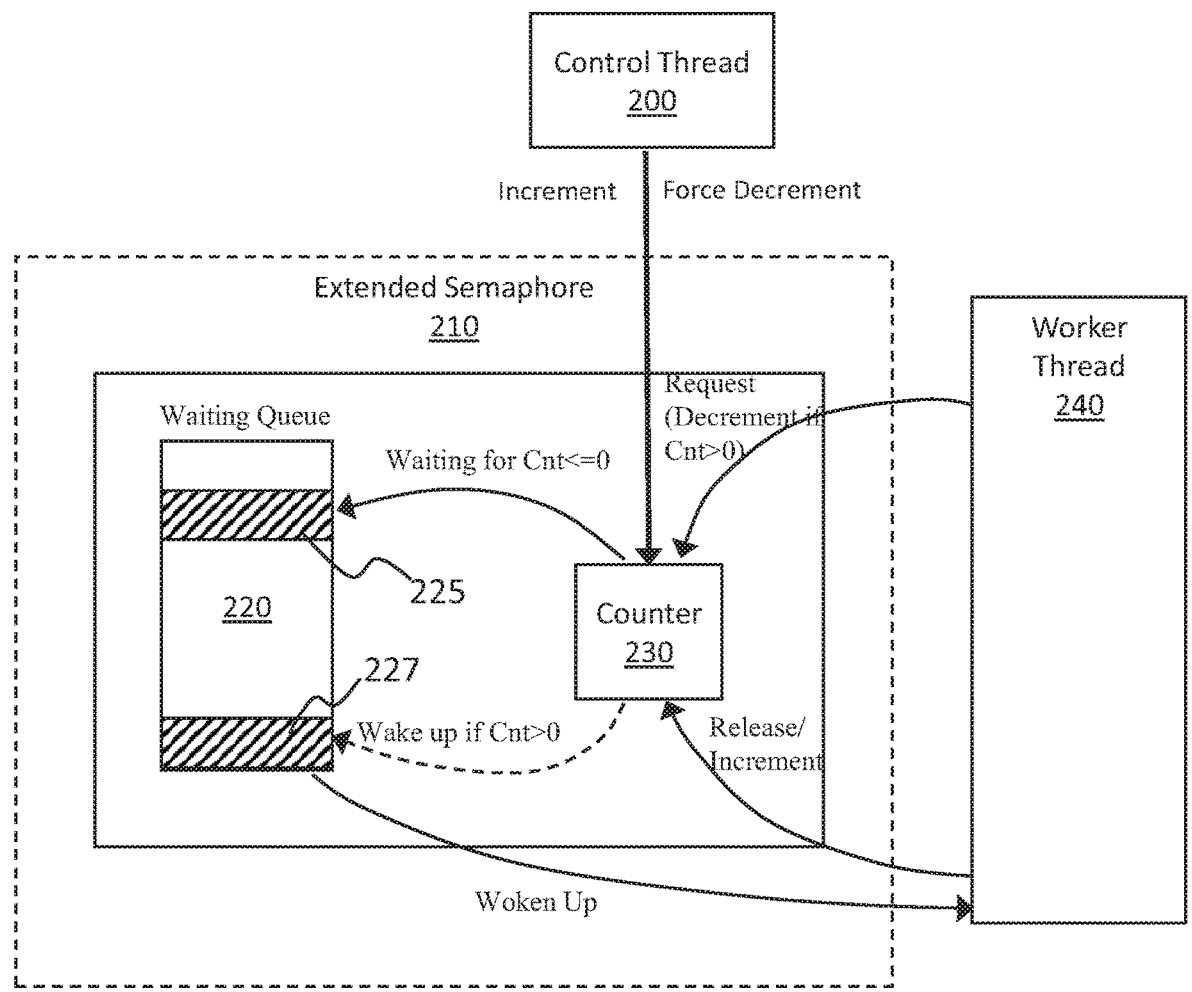
FIG. 2 is an illustrative block diagram of an exemplary semaphore process according to embodiments.

Referring to FIG. 2, an illustrative block diagram of an exemplary semaphore process is shown according to embodiments. A semaphore 210 processes requests from worker threads (e.g., worker thread 240) for access to a resource (e.g., storage pages), which is kept count of by a semaphore counter 230. When a resource is available to the worker thread 240, the counter 230 is decremented. If a resource is not available, the worker thread's request will be put in a semaphore queue 220 (e.g., at queue slot 225). Once a resource becomes available (as reflected by a semaphore counter that is greater than zero), the next waiting thread in line (if any) in the queue (e.g., at queue slot 227) will be "woken up" and the newly available resource(s) will be allocated to the thread. The semaphore 210 will correspondingly (depending on the number of resources allocated) decrement the semaphore counter 230. Once the thread is finished utilizing the resource and releases it, the semaphore counter will be incremented accordingly.

A control thread 200 can increment or decrement semaphore counter 230 to manipulate the availability of resources (e.g., based on a preemptive system policy). By utilizing a force decrement command such as described in embodiments as described herein, the control thread need not wait for worker threads in the queue 220 to be allocated and finish utilizing the resources before the control thread reallocation (increment or forced decrement) occurs. That is, even though the semaphore counter may be zero or less, the counter will be further decremented by the force decrement command to a value which can be less than zero.

Figure 3:
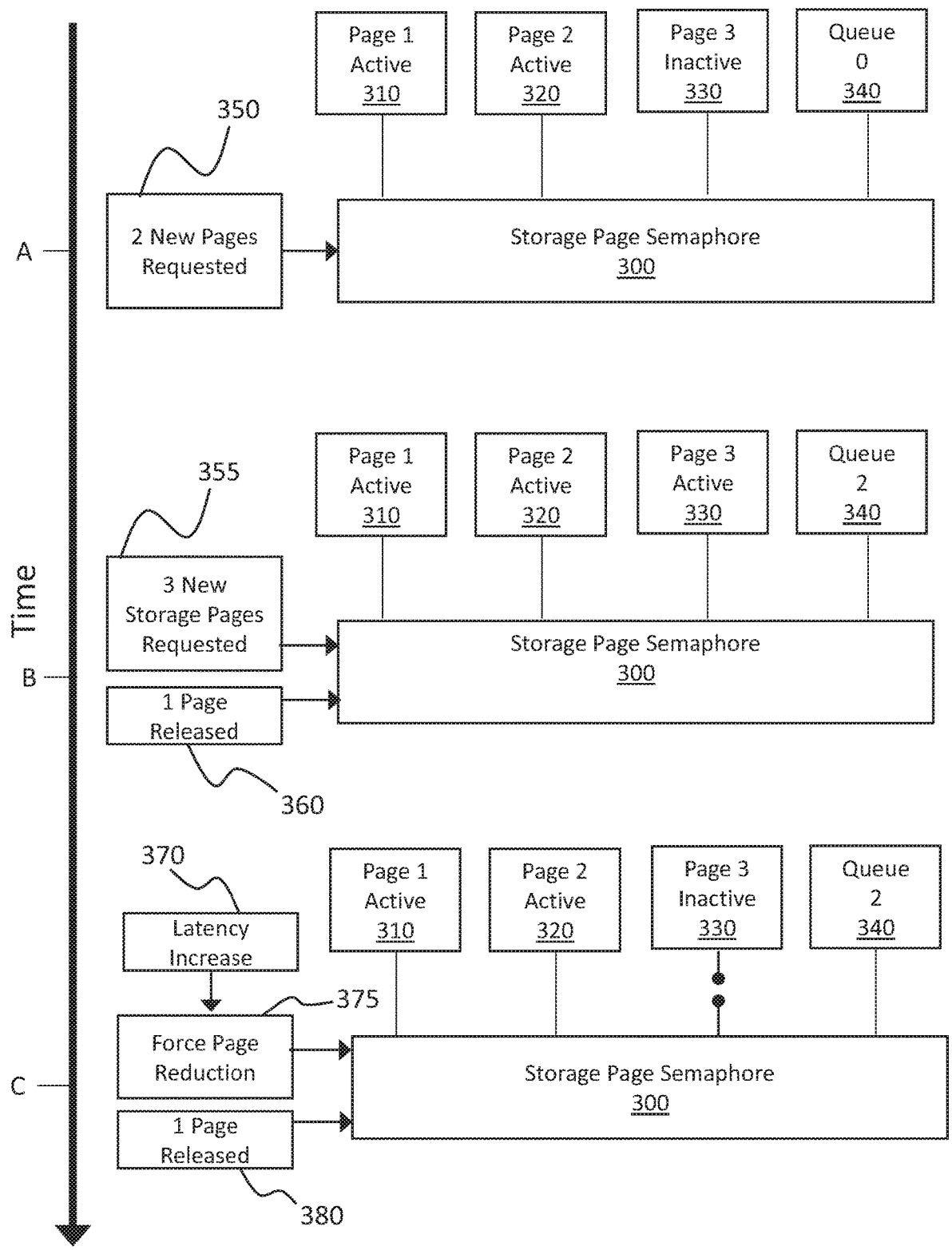
FIG. 3 is an illustrative block time diagram of storage page process utilizing a semaphore according to embodiments.

Referring to FIG. 3, an illustrative block time diagram of storage page process utilizing a semaphore is shown according to embodiments. A storage page semaphore 300 controls the flow of concurrent access to several pages (pages 310, 320, and 330) available for storing data. A queue 340 of the semaphore 300 represents the number of waiting threads. At a time A, two pages are requested at block 350 (e.g., by a worker thread), after which pages 310 and 320 are allocated.

At a time B, three new pages are requested at block 355 and one additional page write is made available (e.g., by a worker thread) at block 360. The only available page 330 is subsequently written to and the remaining two requests are placed in the queue 340. In another embodiment, the semaphore 300 may only allocate a request for multiple pages if all of the pages are available at that time (see, e.g., FIG. 4 and accompanying description).

At a time C, a latency increase (e.g., a slowdown in processing data functions) at block 370 occurs and, in response, a "choker" control thread (not shown) forces a reduction at block 375 in the number of concurrently accessible pages (from three to two in order to counteract the latency). In an embodiment, immediately after page 330 is released by a worker thread at block 380, the page 330 is no longer available to worker threads, even those waiting in queue 340. A control thread can subsequently increment the available pages (e.g., reconnect and make page 330 available again) to working threads. In an embodiment, the semaphore counter represents a maximum number of concurrently available resources (e.g., bytes, blocks, pages, or cache entries).

In some embodiments, multiple control threads (e.g., a destager thread and an I/O thread) may be capable of force decrementing the semaphore counter and/or removing entries in the working queue (e.g., for purposes of a related system operation) and/or a destager queue. If decrementing the semaphore counter and removing one or more entries from the working queue is not an atomic operation, a "double decrement" and resulting semaphore counter of zero is possible prior to both operations and a recovery in consistency of the semaphore occurs. By allowing the semaphore counter to decrement to a value of less than zero, the "double decrement" and subsequent recovery process can occur without waiting for other resources to be freed from the queue.

Table 2 shown below illustrates semaphore counter values over a series of events according to embodiments.

TABLE 2

| EVENT | Semaphore count | Number of entries in destager queue | Semaphore Queue | Notes |
|---|---|---|---|---|
| Begin | 0 | 0 | 0 | Beginning state |
| Worker_1 thread decrements the semaphore by batch_size (e.g., 4) | 0 | 0 | 4 | Worker_1 thread is waiting with 4 entries in semaphore queue for sufficient entries to be added to destager queue |
| IO (control) thread adds entry to destager queue and increments semaphore counter | 1 | 1 | 4 | |
| IO (control) thread adds two entries to destager queue | 3 | 3 | 4 | |

TABLE 2-continued

| EVENT | Semaphore count | Number of entries in destager queue | Semaphore Queue | Notes |
|---|---|---|---|---|
| Worker_2 thread decrements the semaphore by batch_size (i.e. 4) | 3 | 3 | 8 | Worker_2 thread is waiting in semaphore queue with 4 additional entries in destager queue |
| IO thread adds 2 entries to destager queue | 1 ( 3 + 2 − 4) | 5 | 4 | Worker_1 thread is released from the semaphore queue and woken up |
| (Result after the previous event) | 1 | 1 | 4 | 4 entries are released from the destager queue and Worker_1 thread processes them |
| IO (control) thread adds 5 entries to destager queue | 2 (1 + 5 − 4) | 6 | 4 | |
| (Result after the previous event) | 2 | 2 | 0 | 4 entries from destager queue are released and Worker_2 thread remove 4 entries from the destager queue and processes them |
| IO thread added 1 entry to destager queue | 3 | 3 | 0 | |
| IO thread added 1 entry to destager queue | 4 | 4 | 0 | |
| Worker1 thread decrement the semaphore by batch_size (i.e. 4) | 0 | 4 | 4 | Worker_1 reserved 4 entries but has not yet removed them from destager queue |
| IO thread invalidate one of cache entries located in the Destager queue (result of overwrite, for example) | −1 | 3 | 4 | 10 thread removes the queue entry and force decrements the semaphore accordingly |
| Worker_1 thread tried to remove 4 entries (it already reserved), but only successfully removed 3 entries | −1 | 0 | 0 | Worker_1 failed to find and remove 4 entries from destager queue (there were only 3 in the queue), it succeeded in removing 3 entries |
| Continuation of the previous event: Worker_1 recovers semaphore consistency by incrementing it by delta 4 − 3 = 1 and 2) Worker_1 process 3 entries (incomplete batch) | 0 | 0 | 0 | Since Worker1 processed less entries than it decremented/reserved it understand, the "double decrement" case occurred, so it recovers the semaphore consistency (by incrementing it on the delta 4 − 3 = 1) |

Figure 4:
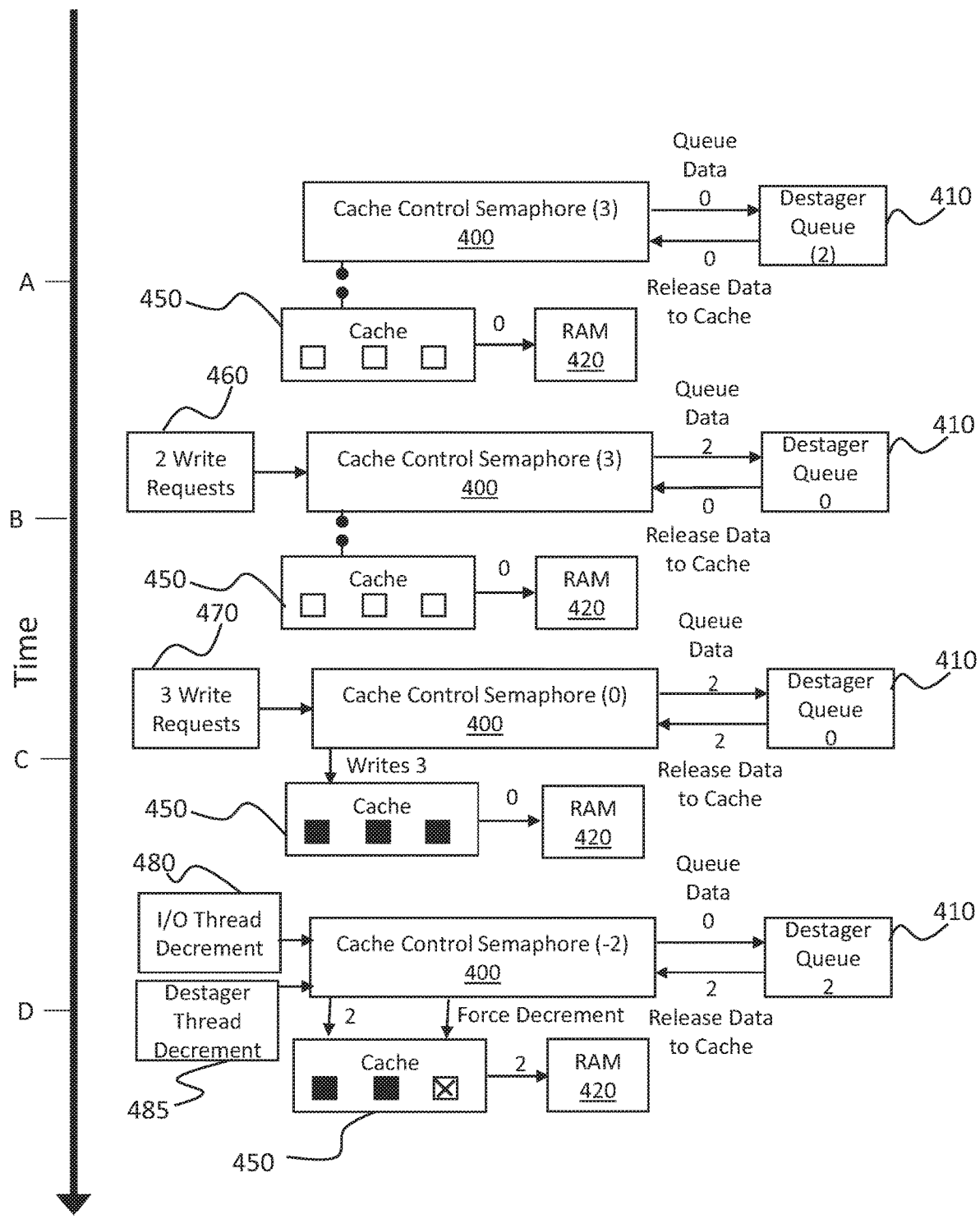
FIG. 4 is an illustrative block time diagram of a cache management system utilizing a semaphore according to embodiments.

Referring to FIG. 4, an illustrative block time diagram of a cache management system utilizing a semaphore is shown according to embodiments. At a time A, a cache destager control semaphore 400 controls destaging from segments of cache memory 450 to non-volatile memory 420 at block 450. A destager queue 410 will keep threads waiting before a write from the cache 450 occurs if the number of segments to be written is two or less. This way, batch processing in quantities of three segments can be written from the cache to improve its efficiency. At time B, semaphore 400 receives two entries for writes from two segments at block 460. At block 455, a worker thread requests writing 3 segments. Because less than two segments are destaged for writing, the requests are placed in the semaphore queue until at least one more memory segment entry is added to the destager queue.

At a time C, three destager entries are received in the semaphore at block 470. Subsequently, three of the cache segments are written by the waiting thread(s) (in the semaphore queue) r. The remaining two entries of the three new entries are added to the destager queue 410. A worker thread also requests to write three entries at block 455.

At a time D, a force decrement by an IO thread of the semaphore 400 at block 480 occurs. Also, a worker thread requests to write three entries at block 485. Before processing the destaging, decrementing the semaphore will be processed as a "force decrement" command and cause the semaphore counter to take on a value of negative one (−1) so that the IO thread does not need to wait for worker thread processing. Subsequent removal of an entry from the destager queue 410 by the working thread causes a "double decrement," However, the "double decrement" can then be recovered from (e.g., by increasing the cache semaphore count by one) by the worker thread.

Figure 5:
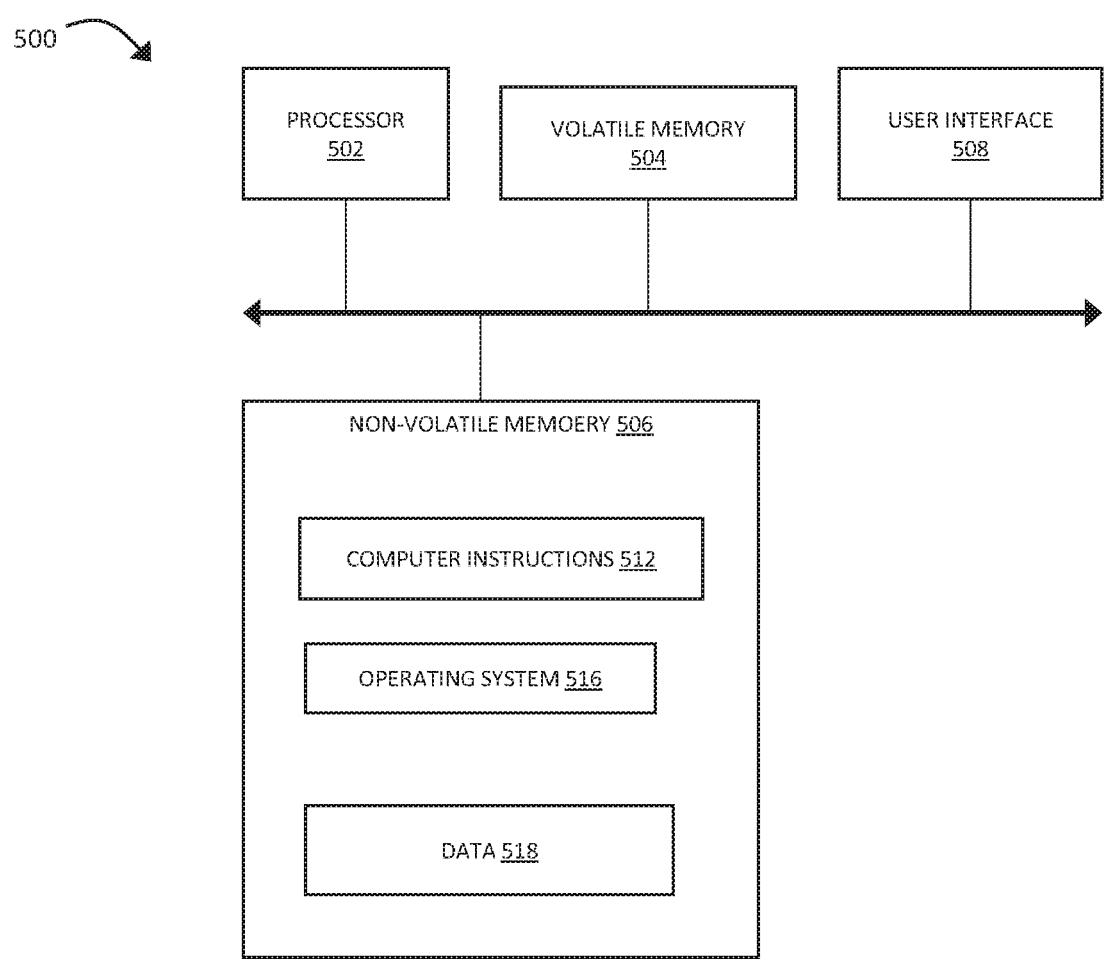
FIG. 5 is an illustrative block diagram of a computer system/processor for programming, configuring, and implementing various components of a semaphore processing system according to embodiments.

Referring to FIG. 5, an illustrative block diagram of an embodiment is provided of a computer system/controller 500 used with various devices of the semaphore processing system in accordance with embodiments (e.g., such as the semaphore control 10, control thread 40, and worker thread 5 of FIG. 1). A computer system 500 includes a processor 502, a volatile memory 504, a non-volatile memory 506 (e.g., hard disk) and a user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., processes illustrated and described in reference to FIGS. 1 through 4).

These processes are not limited to use with particular hardware and software; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. In embodiments, the processor can include ASIC, FPGA, and/or other types of circuits. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes of FIGS. 1 through 4 are not limited to the specific processing order illustrated. Rather, any of the processing blocks of the Figures may be re-ordered, combined or removed, performed in parallel or in serial, as necessary, to achieve the results set forth above.

The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts that have been described and illustrated herein might be made by those skilled in the art without departing from the scope of the following claims.

The invention claimed is:

1. A system for controlling shared computing resources comprising:
   at least one processor operatively coupled to a memory, the at least one processor being configured to instantiate a semaphore for controlling concurrent access to one or more computing resources by one or more worker threads, the semaphore comprising a semaphore counter corresponding to vacancies of the one or more computing resources and a semaphore queue for resource requests of the one or more worker threads, the semaphore programmed and configured to:
   decrement the semaphore counter when allocating any of the one or more computing resources to one of the one or more worker threads;
   increment the semaphore counter when releasing any of the one or more computing resources from one of the one or more worker threads;
   increment the semaphore counter if a request for resource access occurs when the semaphore counter is zero or less than zero; and
   decrement the semaphore counter when receiving a force decrement command from a control thread for reducing a number of computing resources allocable to the one or more worker threads, wherein the semaphore counter will decrease to a negative integer value if the semaphore counter is zero or less than zero at a time of the force decrement command.

2. The system of claim 1 wherein upon decreasing the semaphore counter to a negative integer value, one of the one or more computing resources is deallocated for use by the one or more worker threads prior to any reallocation of the one of the one or more computing resources to the one or more worker threads.

3. The system of claim 1 wherein the one or more computing resources are dedicated to processing data storage requests from the one or more worker threads and the semaphore counter indicates a count of concurrently available data storage segments available for the one or more worker threads.

4. The system of claim 1 wherein the semaphore queue corresponds to a number of resources that need to be requested prior to processing the resource requests of the one or more worker threads.

5. The system of claim 4 wherein the one or more computing resources are dedicated to writing data from cache memory, the one or more worker threads are destagers, and the semaphore counter represents a destager queue size that triggers a release of threads waiting in the semaphore queue.

6. The system of claim 5 wherein upon the semaphore receiving and processing the force decrement command between a time that any of the one or more worker threads decrements the semaphore counter and before the worker thread removes an entry from a working queue, the semaphore counter will be incremented to correct for a double decrement.

7. A method for sharing computing resources comprising:
   providing a semaphore for controlling concurrent access to one or more computing resources by one or more worker threads, the semaphore comprising a semaphore counter corresponding to vacancies of the one or more computing resources and a semaphore queue of waiting resource requests from the one or more worker threads;
   decrementing the semaphore counter when allocating any of the one or more computing resources to one of the one or more worker threads;
   incrementing the semaphore counter when releasing any of the one or more computing resources from one of the one or more worker threads;
   incrementing the semaphore counter from the one or more worker threads if a request for resource access occurs when the semaphore counter is zero or less than zero; and
   decrementing the semaphore counter when receiving a force decrement command from a control thread for reducing a number of computing resources allocable to the one or more worker threads, wherein the semaphore counter will decrease to a negative integer value if the semaphore counter is zero or less than zero at a time of the force decrement command.

8. The method of claim 7 wherein upon decreasing the semaphore counter to a negative integer value, one of the one or more computing resources is deallocated for use by the one or more worker threads prior to any reallocation of the one of the one or more computing resources to the one or more worker threads.

9. The method of claim 7 wherein the one or more computing resources are dedicated to processing data storage requests from the one or more worker threads and the semaphore counter indicates a count of concurrently available data storage segments available for the one or more worker threads.

10. The method of claim 7 wherein the semaphore queue corresponds to a number of resources that need to be requested prior to processing the resource requests of the one or more worker threads.

11. The method of claim 7 wherein the one or more computing resources are dedicated to writing data from cache memory, the one or more worker threads are destagers, and the semaphore counter represents a destager queue size that triggers a release of threads waiting in the semaphore queue.

12. The method of claim 11 wherein upon the semaphore receiving and processing the force decrement command between a time that any of the one or more worker threads decrements the semaphore counter and before the worker thread removes an entry from a working queue, the semaphore counter will be incremented to correct for a double decrement.

13. A computer program product for sharing computing resources, the computer program product comprising a non-transitory computer-readable storage medium encoded with computer-executable program code programmed to cause the execution across one or more processors of:
   providing a semaphore for controlling concurrent access to one or more computing resources by one or more worker threads, the semaphore comprising a semaphore counter corresponding to vacancies of the one or more computing resources and a semaphore queue of waiting resource requests from the one or more worker threads;

decrementing the semaphore counter when allocating any of the one or more computing resources to one of the one or more worker threads;

incrementing the semaphore counter when releasing any of the one or more computing resources from one of the one or more worker threads;

incrementing the semaphore counter if a request for resource access occurs when the semaphore counter is zero or less than zero; and decrementing the semaphore counter when receiving a force decrement command from a control thread for reducing a number of computing resources allocable to the one or more worker threads, wherein the semaphore counter will decrease to a negative integer value if the semaphore counter is zero or less than zero at a time of the force decrement command.

* * * * *